United States Patent
Librizzi et al.

(10) Patent No.: US 7,161,813 B2
(45) Date of Patent: Jan. 9, 2007

(54) POWER CONVERSION DEVICE WITH SYNCHRONOUS RECTIFIER DRIVING AND VOLTAGE OSCILLATION LIMITATION DURING A DISCONTINUOUS OPERATING MODE

(75) Inventors: Fabrizio Librizzi, Gravina Di Carania (IT); Francesco Macina, Masealucia (IT)

(73) Assignee: STMicroelectronics S.r.l., Brianza (IT)

( * ) Notice: Subject to any disclaimer, the term of this patent is extended or adjusted under 35 U.S.C. 154(b) by 73 days.

(21) Appl. No.: 11/019,927

(22) Filed: Dec. 21, 2004

(65) Prior Publication Data

US 2005/0141250 A1 Jun. 30, 2005

(30) Foreign Application Priority Data

Dec. 31, 2003 (EP) ................. 034258319

(51) Int. Cl.
*H02M 3/335* (2006.01)

(52) U.S. Cl. ..................... 363/21.06; 363/89

(58) Field of Classification Search ............ 363/15–20, 363/21.05, 21.06, 95, 97, 91–93; 323/266, 323/282, 220, 223

See application file for complete search history.

(56) References Cited

U.S. PATENT DOCUMENTS 6,101,104 A * 8/2000 Eng ................. 363/21.06
6,418,039 B1 * 7/2002 Lentini et al. ............ 363/21.06

FOREIGN PATENT DOCUMENTS

| EP | 1 148 624 | 10/2001 |
|----|-----------|---------|
| JP | 11-187651 | 7/1999 |
| JP | 11187651 | 7/1999 |
| JP | 200092824 | 3/2000 |
| JP | 2000092824 | 3/2000 |

OTHER PUBLICATIONS

Librizzi, F., "Mit Koepfchen schalten Neue Smart-Driver-Familie vereinfacht die Implementierung von Synchrongleichrichtern fuer isolierte Schaltnetzteil", Elektronik, Franzis Verlag GmbH, Munchen, DE, vol. 51, No. 12, Jun. 11, 2002, pp. 44-49, XP001168119.

Librizzi, F., "STSR3 Simplifies Implementation of Synchronous Rectifier in Flyback Converter", AN1624 Application Note STMicroelectronics, Jan. 2003, pp. 1-22, XP002287536.

European Search Report, EP 03 42 5831, dated Jul. 8, 2004.

* cited by examiner

*Primary Examiner*—Rajnikant B. Patel
(74) *Attorney, Agent, or Firm*—Jenkens & Gilchrist, PC

(57) ABSTRACT

A power conversion device includes a first and second input terminal for connection to a transformer winding and at least an output terminal. A first and second synchronous rectifier are associated with the first and second input terminals, respectively. An inductor within an output stage is connected between the first input terminal and the output terminal. A driving circuit includes first and second output terminals connected to respective control terminals of the first and second synchronous rectifiers. An adjustable threshold control block is connected between the first and second input terminals and is connected to the inductor. The control block is enabled responsive to a control signal on the first output terminal of the driving circuit. The control block operates to clamp the voltage of the first input terminal to a preset value during at least a dead time period of the device operation.

27 Claims, 6 Drawing Sheets

POWER CONVERSION DEVICE WITH SYNCHRONOUS RECTIFIER DRIVING AND VOLTAGE OSCILLATION LIMITATION DURING A DISCONTINUOUS OPERATING MODE

PRIORITY CLAIM

This application claims priority from European Application Patent No. 03425831.9 filed Dec. 31, 2003, the disclosure of which is hereby incorporated by reference.

BACKGROUND OF THE INVENTION

1. Technical Field of the Invention

The present invention relates to a power conversion device with synchronous rectifier driving and, in particular, but not exclusively, to the control of the synchronous rectifiers used inside a power conversion device or power unit in the switching mode.

2. Description of Related Art

As is well known in the field of power conversion devices, particularly low output voltage DC converters, the use of MOS transistors as rectifiers is an increasingly used technique because of its beneficial effect on circuit efficiency due to the low conduction losses of these devices with respect to the traditional rectifiers realized by means of Schottky diodes.

The way a synchronous rectifier (SR) is controlled is fundamental for the correct operation of the conversion device. Convenient techniques have thus been used to drive these synchronous rectifiers according to the law of the diode to be replaced by the synchronous rectifier. For example, by deriving a driving signal from a main control signal PWM it is possible to determine the different conditions of the conversion device in the switching mode and thus of the management conditions for the device diodes.

The way the driving signal can be derived from the main signal PWM, in order to correctly control a synchronous rectifier, depends on the kind of circuit topology used and on the galvanic insulation of this topology.

In particular, in an non-insulated topology of a conversion device or power unit in the switching mode, a synchronous rectifier control circuit can obtain information about the main switch switching transitions (turn-on and turn-off) from the main control circuit in a very simple way.

In insulated topologies, if the main signal PWM is located on the secondary side, the synchronous rectifier driving operation can be easily solved. In fact, since the signal PWM is available on the secondary side, it can be used to generate the synchronous rectifier driving signal. Convenient delays can be added to the signal PWM to compensate propagation delays affecting the driving signal being transferred to the primary side by means of a convenient coupling device. The timing required for this kind of operation is shown in FIG. 1A, in the more general case of two complementary signals on the secondary side.

It is worth remembering that it is necessary to provide some dead time between the driving signals to prevent a simultaneous conduction between synchronous rectifiers or between a synchronous rectifier and a main MOS transistor.

In particular, FIG. 1A indicates the timing required for a synchronous rectifier driving signal according to a general topology configuration in the switching mode with a main switch and only one diode, wherein the possible conduction times for the switch and the diode are complementary.

Dead times, as shown in FIG. 1A, prevent the simultaneous conduction of the main switch and of the synchronous rectifier used as diode, but they must be reduced to the lowest time value to minimize the parasitic diode conduction times of the synchronous rectifier and the subsequent efficiency loss.

On the other hand, in insulated topologies with main control on the primary side, the absence of the control signal PWM on the secondary side of the insulation barrier makes the generation of convenient control signals for the synchronous rectifiers more difficult. In this case, only the voltage signal on the transformer secondary side provides the information about the main switch switching transitions (turn-on and turn-off). However, this signal is difficult to manage, mainly because of the two following effects:

1. the delay introduced by the insulation transformer; and
2. the non-squared waveform during the discontinuous operation mode.

The problem related to the delay introduced by the insulation transformer has been faced and solved in European Application for Patent no. 1,148,624 filed in the name of the same Applicant, the disclosure of which is hereby incorporated by reference.

The problem related to the non-squared waveform is linked to the fact that the clock signal output by the insulation transformer is affected by the switching of the main switch.

In fact, this signal shows a similar behavior to the main signal PWM, at least in the continuous conduction mode, but it is also affected by the parasitic elements in the conversion device. Moreover, if the continuous operation state is not respected, the oscillations of this signal can determine false driving information.

Convenient synchronous rectifier driving signals must thus be provided, effective to prevent possible wrong active conditions derived from all the effects of timing on the synchronization of the signal available on the secondary clock signal PWM with respect to the primary signal PWM from occurring.

By using the output of the insulation transformer as the clock signal PWM, it is known to use a technique known as "self-driving synchronous rectification", schematically shown in FIG. 1, and globally indicated with 1, to let MOS transistors operate like rectifiers, particularly in insulated topologies based on the forward topology.

The device 1 is connected to the winding 2 of a transformer and it comprises a first MOS transistor M2, connected between a first terminal T1 and a second terminal T2 of the winding 2 and having a gate terminal connected to the second terminal T2. The device 1 also comprises a second MOS transistor M1, connected between the second terminal T2 of the winding 2 and an output terminal OUT2 of the device 1 and having a gate terminal connected to the first terminal T1.

The device 1 also comprises an inductor L1 connected between the first terminal T1 and a further output terminal OUT1 of the device 1, as well as a capacitor C1, connected between the output terminals OUT1 and OUT2. The inductor L1 and the capacitor C1 form a linear output stage LC.

It should be noted that the connection of the output terminals of MOS transistors M1 and M2 to the terminals T1 and T2 allows these transistors to be correctly driven, according to the diode equivalent law.

In fact, the information related to the primary winding switching transitions are actually provided by the square component of the output signal of the winding 2.

In discontinuous device operation modes, when the current in the inductor L1 reaches the zero value, the oscillation of the reactive elements of the device 1 thus complicates the detection of the switching transitions on the winding 2.

It is thus known to equip the device 1 with a driving circuit 3 effective to drive synchronous rectifiers, indicated with SR1 and SR2 and realized by these MOS transistors M1 and M2, as schematically shown in FIG. 2. In particular, the device 1 shown in FIG. 2 is single-output-configured, i.e., it has the second terminal T2 connected to a potential reference, particularly to the ground GND, for convenience of illustration.

In particular, the driving circuit 3 must be able to manage a clock signal separately from the insulation transformer output and to solve any other problem concerning the signal synchronization on the output terminals OUT1, OUT2 of the device 1, particularly with respect to the clock signal.

Moreover, the driving circuit 3 must set the timing of the synchronous rectifier driving signal starting from the clock signal, providing, as already explained, convenient dead times between the clock signal and the driving signal of the synchronous rectifier RS to avoid the crossed conduction between the device elements.

The driving circuit 3 shown in FIG. 2 has a first input terminal N1 and a second input terminal N2 respectively connected to a first voltage reference, particularly a supply voltage Vcc, and to a second voltage reference, particularly a ground GND, as well as a third input terminal N3 connected to the second terminal T2, connected in turn to the ground GND.

The driving circuit has also a first output terminal N4 and a second output terminal N5 respectively connected to the gate terminals of the synchronous rectifiers SR1 and SR2, as well as a forth input terminal N6 receiving an external signal SETANT.

Finally, the driving circuit 3 has a fifth input terminal N7 connected to an intermediate terminal of a resistive divider 4, comprising a first resistive element R1 and a second resistive element R2, inserted between the first terminal T1 of the winding 2 and the ground GND, as well as a sixth input terminal N8 connected, by means of a third resistive element R3 to the first terminal T1 of the winding 2.

In particular, the fifth input terminal N7 receives an internal clock signal, while the sixth input terminal N8 receives an inhibition signal INHIBIT.

A driving circuit 3 for the synchronous rectifiers on the secondary side of insulated topologies (particularly of the Forward type), having a configuration like the one shown in FIG. 2, is marketed by STMicroelectronics under the product name STSR2 and it is described in the above-mentioned European patent application. Nevertheless, other synchronous rectifier driving circuits realized according to the prior art can be used.

It can be easily verified that, when the device 1 operates in the discontinuous mode, the synchronous rectifier SR2, operating as free-wheeling for the inductor L1 current, is turned on and off several times in the same switching period, thus causing an increase in switching losses, as well as generating irradiated noise.

The same problem occurs when the synchronous rectifiers SR1 and SR2 are driven by integrated circuits usually called drivers, which, upon detecting the switching transition by means of a threshold comparator, generate convenient output signals for the synchronous rectifiers SR1 and SR2. In this case, the trend of the driving signal outputted by these drivers is however not correct, as graphically shown in FIG. 3, showing the trend of the voltage signal (signal A) applied to the free-wheeling synchronous rectifier SR2 in correspondence with switchings detected (signal B) by the threshold comparator.

Although it is possible to change the threshold value of the comparator used to detect switching transitions, in many cases the oscillation of the comparator input signal has actually an amplitude comparable to the amplitude of the squared signal causing the incorrect driving of the synchronous rectifiers.

The device 1 shown in FIG. 2 is capable of providing two driving signals with a dead time DT set so as to correctly drive the synchronous rectifiers, as schematically shown in FIG. 4.

In particular, the driving circuit 3 comprises a peak detector connected to the input of the clock signal Ck. This detector is able to distinguish the switching transitions of the primary MOS transistor and possible sinusoidal wave signals caused by the discontinuous mode operation. The signal INHIBIT is used to turn the free-wheeling synchronous rectifier SR2 off during the dead time DT. An embodiment of a driving circuit 3 of this type is schematically shown in FIG. 2A.

In particular, the driving circuit 3 shown in FIG. 2A comprises a gate control circuit 5 input-connected to the fifth N7 and sixth input terminal N8, by means of a first 6 and second threshold comparator 7 respectively. The gate control circuit 5 is also output-connected to the first N4 and second output terminal N5, by means of a first 8 and second output buffer 9 respectively.

Actually, the peak detector is able to perform a correct distinction only when a difference $\Delta V$ of at least 400 mV is present between the squared signal and the sinusoidal signal.

In fact, when the square wave signal and the sinusoidal signal have comparable amplitudes, if not the same, and even more when the sinusoidal signal has a higher amplitude value than the square wave signal, the peak detector of the driving circuit 3 is not able to correctly distinguish switching transitions of the primary winding.

This known solution, although advantageous under several aspects, cannot however be used in all applications.

A need accordingly exists in the art to provide a synchronous rectifier driving circuit able to correctly detect switching transitions even when the conversion device associated thereto operates in the discontinuous mode, thus overcoming the limits and drawbacks still affecting prior art devices.

SUMMARY OF THE INVENTION

In accordance with an embodiment of the invention, a control device is used to inhibit the energy flow towards the inductor in the critical operating conditions of the conversion device.

In accordance with an embodiment of the invention, a power conversion device, comprises a first and second input terminal for connection to a transformer winding and an output terminal. At least a first and second synchronous rectifier are provided in association with the first and second input terminals, respectively. An inductor is inserted between the first input terminal and the output terminal. A driving circuit includes at least first and second output terminals connected to respective control terminals of said first and second synchronous rectifiers. An adjustable threshold control block is connected between said first and second input terminal and connected to said inductor and is enabled on a low level of a control signal on said first output terminal of said driving circuit.

In accordance with another embodiment of the invention, a power conversion device comprises a synchronous rectification circuit for connection to a transformer winding and including a rectifier node. An inductor is coupled between the rectifier node and an output node. A control circuit, including a first conduction terminal connected to the rectifier node and including a control terminal, operates responsive to control terminal receipt of an active state first control signal to set a voltage of the rectifier node to a certain value.

In accordance with yet another embodiment, a power conversion device comprises a synchronous rectification circuit for connection to a transformer winding and including a rectifier node. An inductor is coupled between the rectifier node and an output node. A switchable voltage clamping circuit, including a clamp terminal connected to the rectifier node and a control terminal, operates responsive to control terminal receipt of an active state control signal to clamp a voltage of the rectifier node to a certain value.

In accordance with another embodiment of the invention, a control method for a synchronous rectifier within a power conversion device comprises limiting a voltage value applied to said synchronous rectifier during a discontinuous mode of operation of said power conversion device.

In another embodiment, a control method for a synchronous rectifier within a power conversion device having an "on" time period, and "off" time period and a "dead" time period, comprises setting a transformed winding terminal voltage value to a certain value during at least the dead time period.

BRIEF DESCRIPTION OF THE DRAWINGS

A more complete understanding of the invention may be obtained by reference to the following Detailed Description and with reference to the accompanying drawings wherein.

DETAILED DESCRIPTION OF THE DRAWINGS

The following description of embodiments of the invention is made with reference to the control of synchronous rectifiers used inside a power conversion device or power unit in the switching mode for convenience of illustration only. It will be understood by those skilled in the art that the invention has other uses.

Figure 1:
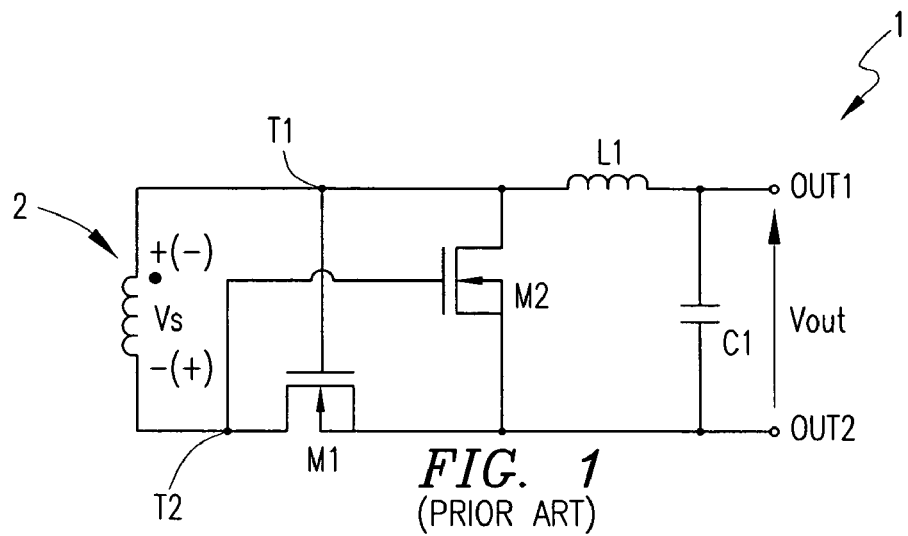
FIG. 1 schematically shows a conversion device with self-driving synchronous rectification of the known type.
Figure 2:
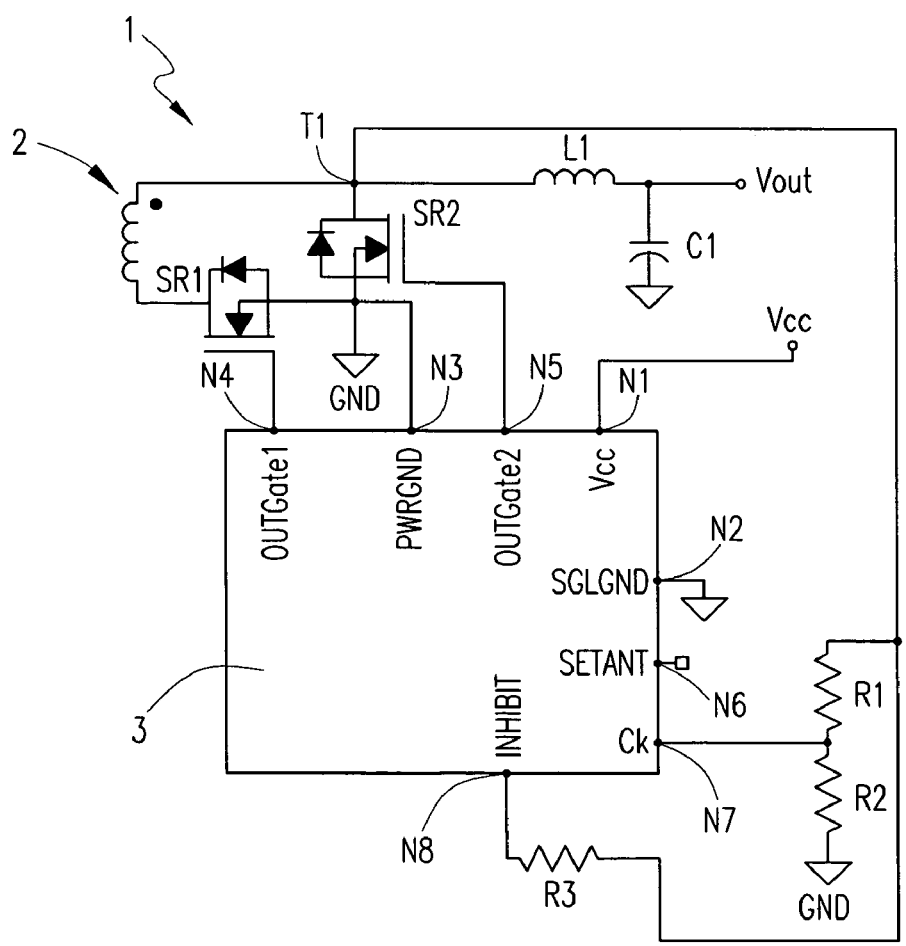
FIG. 2 schematically shows a synchronous rectifier driving circuit associated to the device of FIG. 1.
Figure 1A:
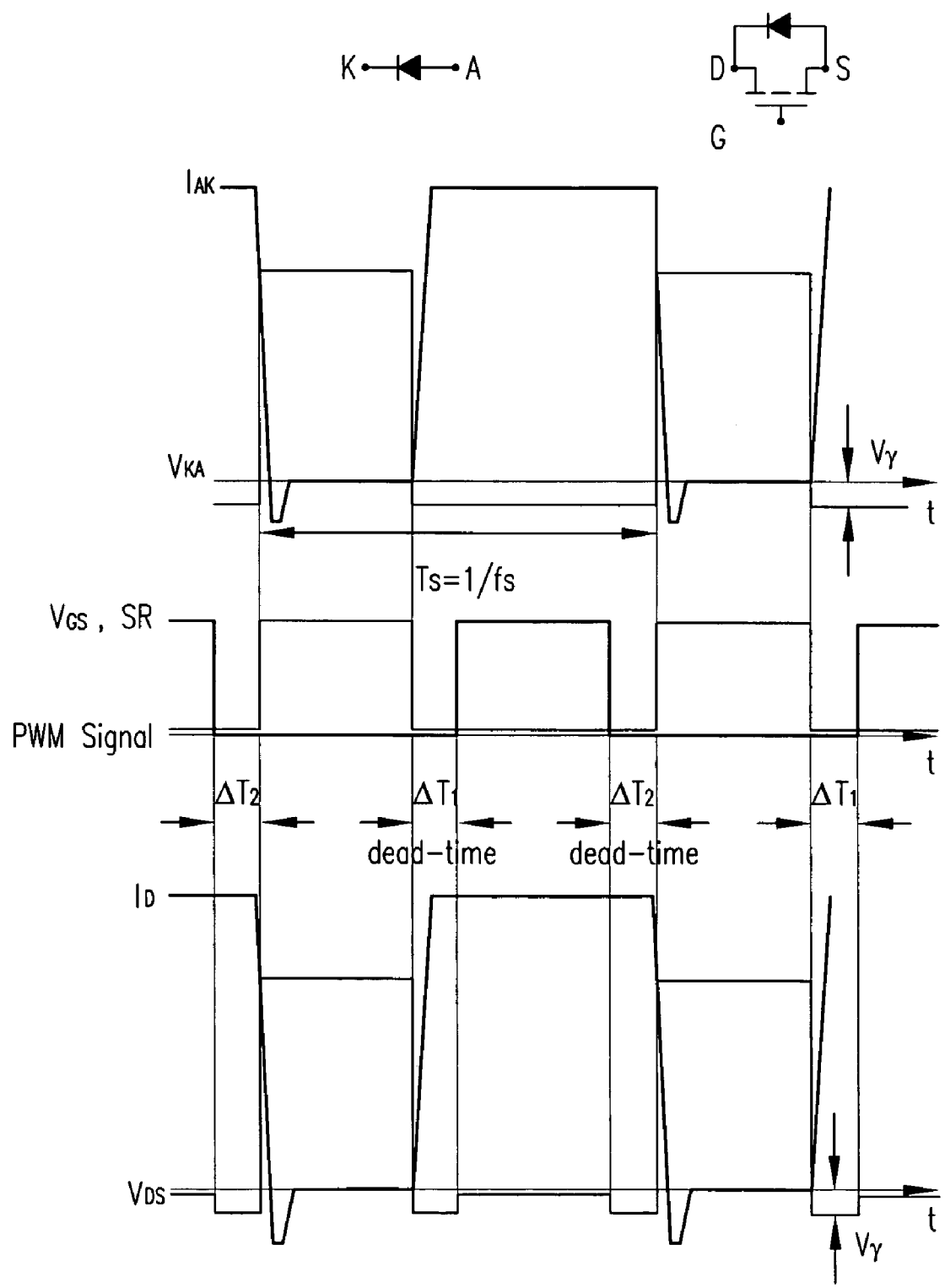
FIG. 1A shows signal waveforms inside a conversion device comprising synchronous rectifiers of the known type.
Figure 5:
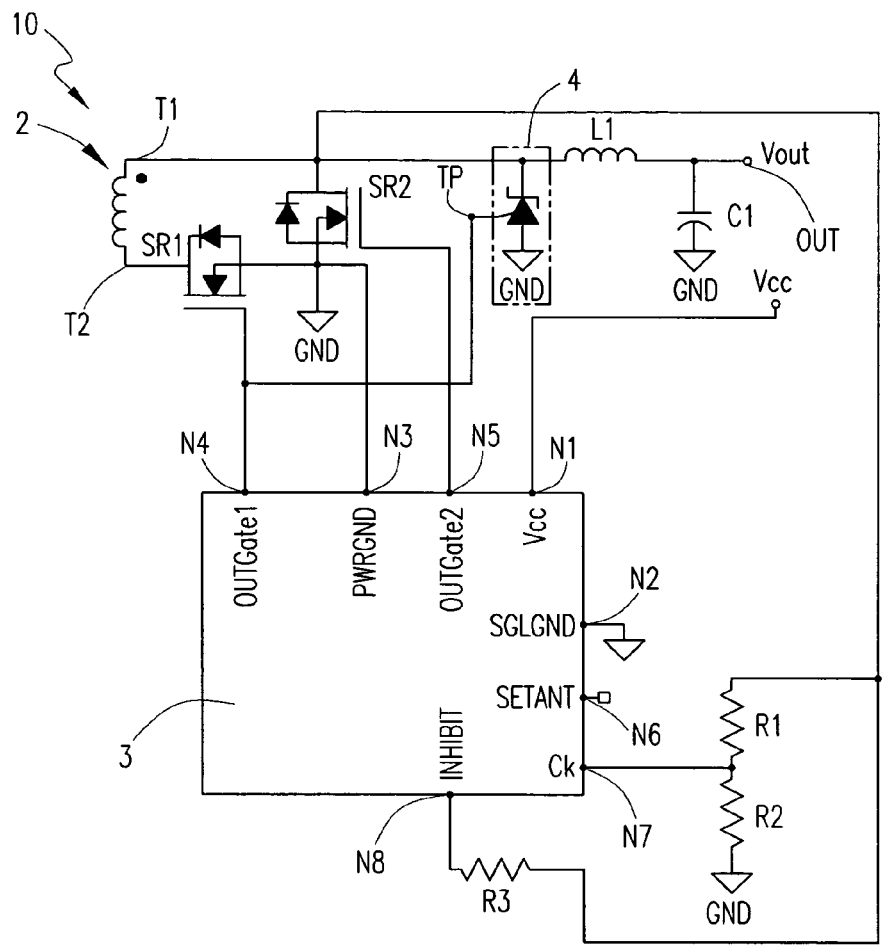
FIG. 5 schematically shows a conversion device with driving circuit realized according to an embodiment of the invention.
Figure 2A:
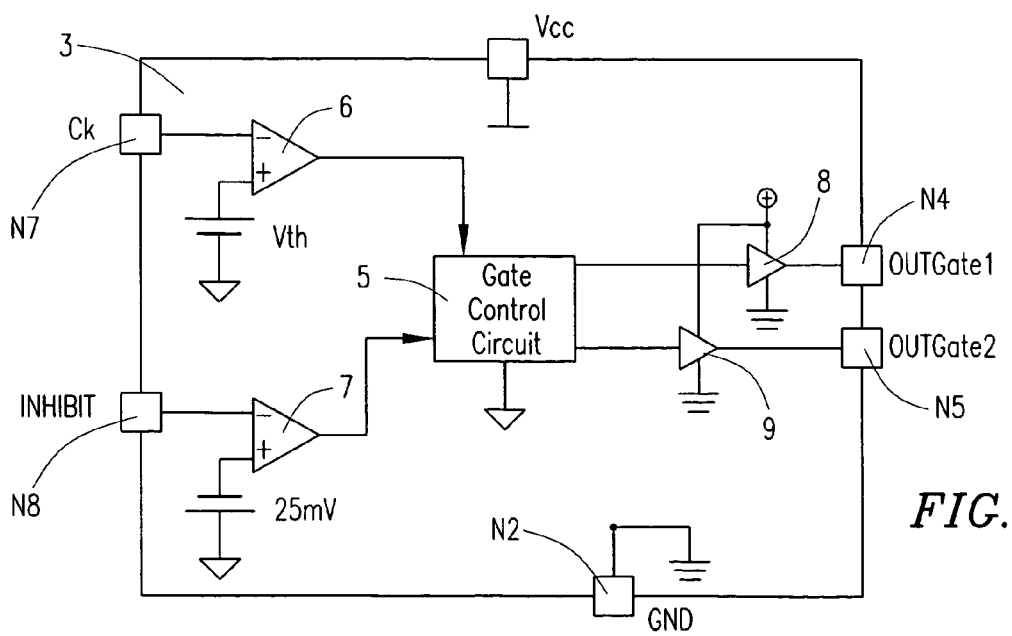
FIG. 2A schematically shows a detail of the circuit of FIG. 2.
Figure 3:
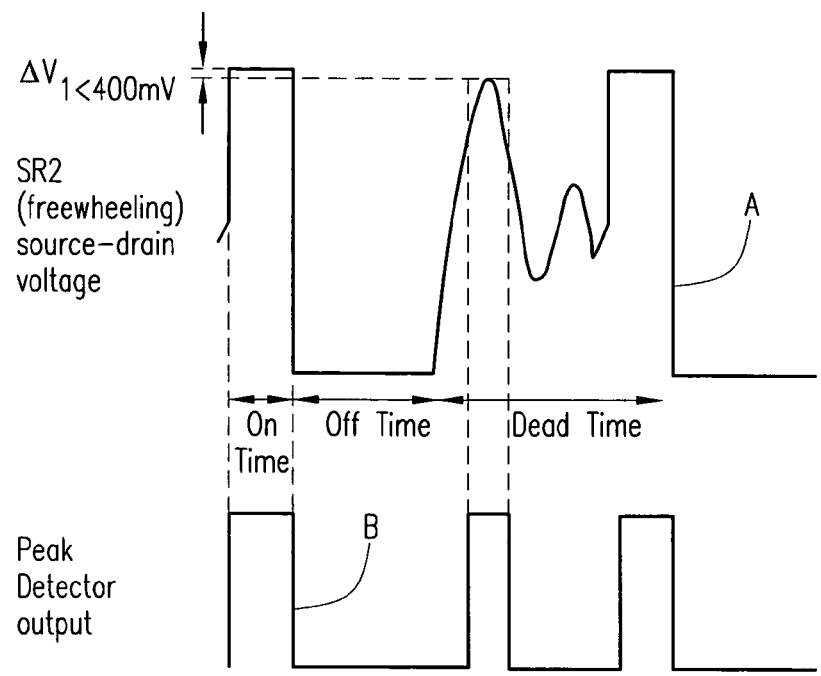
FIG. 3 shows the trend in time of internal signals of the device of FIG. 1.
Figure 4:
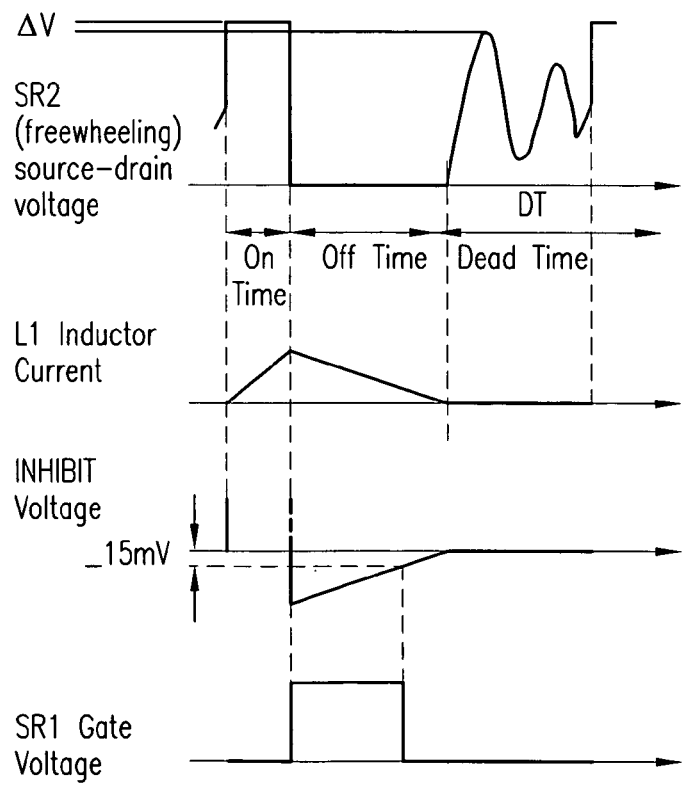
FIG. 4 shows the trend in time of internal signals of the circuit of FIG. 2.

With reference to FIG. 5, a conversion device with a synchronous rectifier driving circuit realized according to an embodiment of the invention and globally indicated with reference 10 is now described. Elements being structurally and functionally identical to the devices already described for the prior art will be given the same numeral references.

As seen with reference to the prior art, the device 10 is connected to a transformer winding 2 and it comprises a first synchronous rectifier SR1 and a second synchronous rectifier SR2. In particular, the second synchronous rectifier SR2 is connected between a first terminal T1 and a second terminal T2 of the winding 2, while the first synchronous rectifier SR1 is connected between the second terminal T2 of the winding 2 and a voltage reference, more particularly ground GND.

The device 10 also comprises an inductor L1 connected between the first terminal T1 and an output terminal OUT of the device 10 itself, as well as a capacitor C1, connected between the output terminal OUT and the ground GND. The inductor L1 and the capacitor C1 form an output stage LC.

Moreover, the device 10 is equipped with a driving circuit 3 effective to drive the synchronous rectifiers SR1 and SR2. In particular, the driving circuit 3 has respective terminals connected to the control or gate terminals of the synchronous rectifiers SR1 and SR2.

The driving circuit 3 has a first input terminal N1 and a second input terminal N2 respectively connected to a first voltage reference, more particularly a supply voltage Vcc, and to a second voltage reference, more particularly ground GND, as well as a third input terminal N3 connected to the ground GND in correspondence with the second synchronous rectifier SR2.

The driving circuit 3 thus has a first output terminal N4 and a second output terminal N5 respectively connected to the gate terminals of the synchronous rectifiers SR1 and SR2, as well as a forth input terminal N6 receiving an external signal SETANT.

Finally, the driving circuit 3 has a fifth input terminal N7 connected to an intermediate terminal of a resistive divider 4, comprising a first resistive element R1 and a second resistive element R2, inserted between the first terminal T1 of the winding 2 and the ground GND, as well as a sixth input terminal N8 connected, by means of a third resistive element R3 to the first terminal T1 of the winding 2.

In particular, the fifth input terminal N7 receives an internal clock signal, while the sixth input terminal N8 receives an inhibition signal INHIBIT.

Advantageously according to the invention, the device 10 comprises a control block 4, connected between the first terminal T1 of the winding 2 and the ground reference GND and having a driving terminal TP connected to the first output terminal N4 of the driving circuit 3 and thus to the control or gate terminal of the first synchronous rectifier SR1.

Substantially, the control block 4 is an adjustable threshold block enabled on the low level of a first control signal OUTGate1 on the first output terminal N4 of the driving circuit 3 effective to limit the voltage of the terminal T1 with respect to the ground GND at a predetermined threshold value.

In fact it is worth noting that, in the discontinuous operating mode, i.e., in the critical periods of prior art devices, the inductor L1 outputs, to a load connected to the output terminal OUT of the device 10, all the energy stored in the turn-on period Ton, before the following switching cycle of the control signal PWM occurs.

In other words, the current flowing in the second synchronous rectifier SR2 crosses zero and it thus inverts its direction, forcing this second synchronous rectifier SR2 to operate in the forth quadrant and thus to discharge the capacitor C1 located at the output.

As seen with reference to the prior art, this condition, which reduces the overall efficiency of the device 10, is avoided by using the driving circuit 3, which turns the second synchronous rectifier SR2 off when the drain-source voltage thereof is higher than a threshold value, particularly equal to −15 mV.

In fact, as soon as the energy stored in the inductor L1 is totally transferred to the load, the parasitic capacitance Coss=Cds+Cdg of the second synchronous rectifier SR2 and the resounded inductor L1 and the drain voltage value of the second synchronous rectifier SR2, disregarding parasitic resistances, is given by:

$$V_{DS}(SR2) = V_O - V_O \cdot \sin\left(\frac{t}{\sqrt{L_1 \cdot C_{OSS}}}\right) \quad (1)$$

It can be easily verified that the highest value of this voltage is equal to:

$$V_{DS}(SR2)_{max} = 2 \cdot V_O \quad (2)$$

Therefore, if the voltage difference between the drain source voltage $V_{DS}$ of the synchronous rectifier SR2 during the turn-on period Ton ($V_{DS}$(on)) and the highest value given by the above-indicated Equation (2) is higher than the threshold of the comparator comprised in the driving circuit 3, for example equal to 400 mV, the driving circuit 3 is improperly triggered and the synchronization on the primary side of the conversion device is lost.

Figure 6:
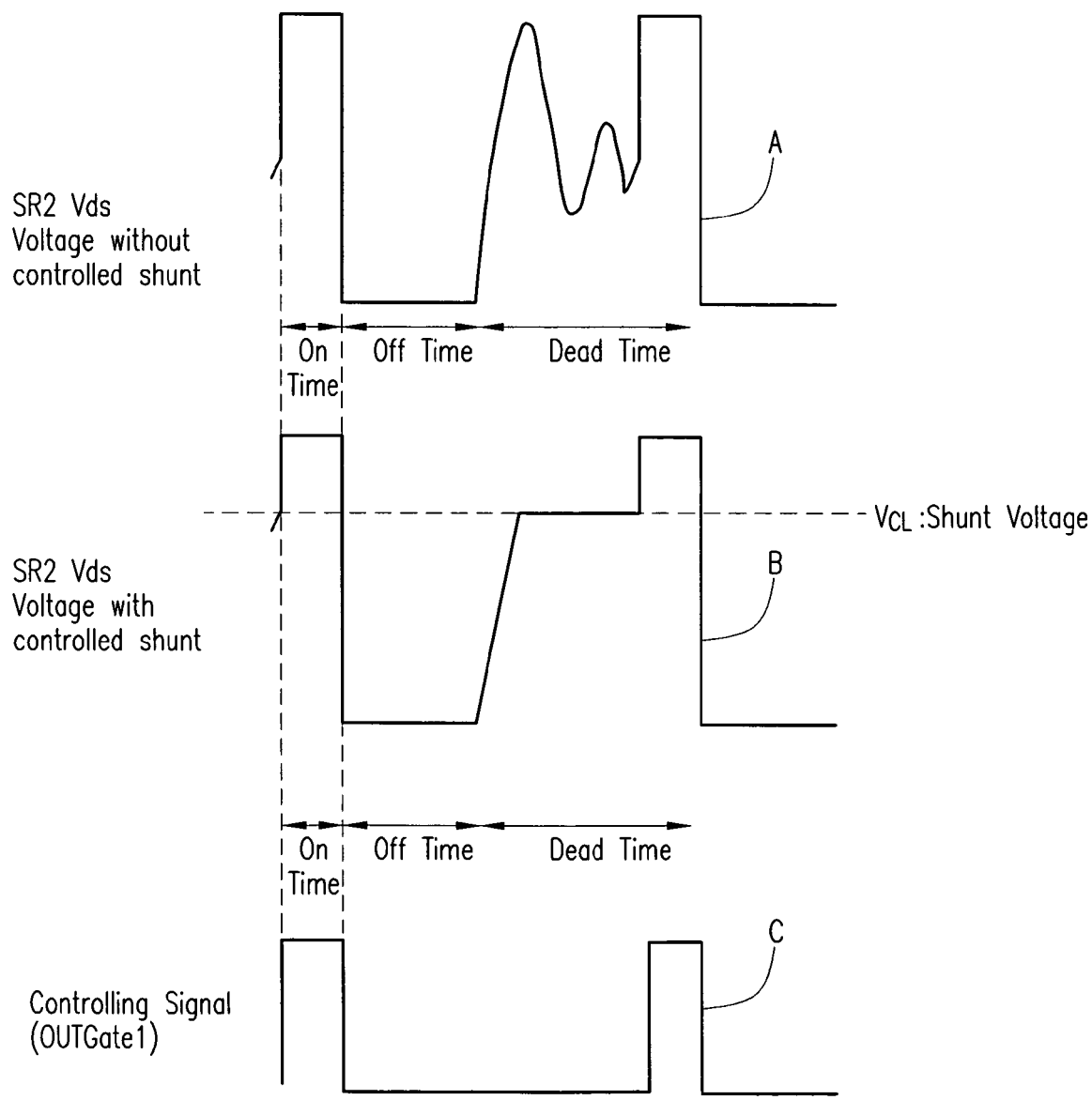
FIG. 6 shows signal waveforms for the device of FIG. 5.

Advantageously according to the invention, the control block 4, located in parallel with the second synchronous rectifier SR2 in a shunt configuration, is set with a conveniently chosen clamp voltage VCL and it is enabled on the low level of the first control signal OUTGate1 on the first output terminal N4 of the driving circuit 3, as schematically shown in FIG. 6, showing the waveforms of the drain-source voltage of the second synchronous rectifier SR2 without control block 4 (signal A), with control block 4 (signal B), as well as the waveform of the signal OUTGate1 on the first output signal N4 of the driving circuit 3 and used as control signal (C) applied to the driving terminal TP of the control block 4.

Therefore, the control block 4 limits the voltage on the terminal T1 allowing the comparator comprised in the driving circuit 3 to have a correct synchronization on the primary side of the conversion device.

Figure 7A:
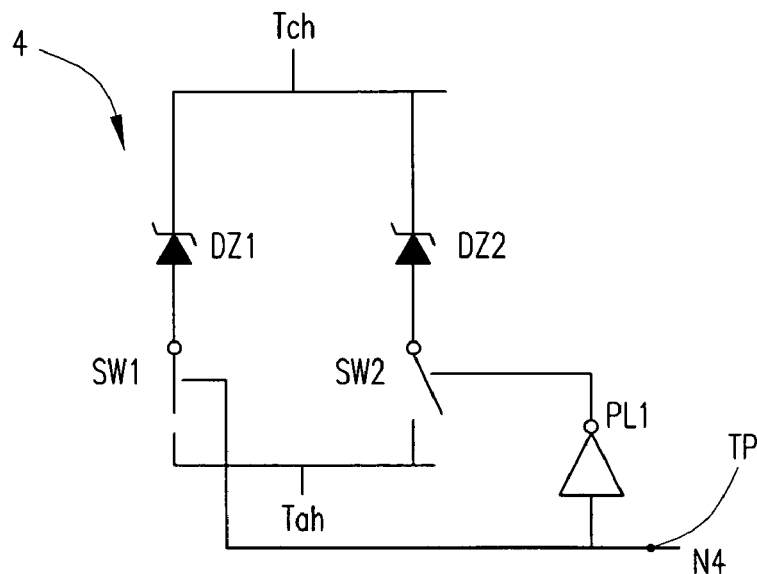
FIGS. 7A, 7B and 7C show alternative embodiments of a portion of the driving circuit of FIG. 5.

A fully general possible implementation of the control block 4 is schematically shown in FIG. 7A.

The control block 4 has a first terminal or cathode Tch and a second terminal or anode Tah, as well as a driving terminal TP. In particular, considering the device 10 shown in FIG. 5, the cathode terminal Tch of the control block 4 is connected to the terminal T1 of the device 10, the anode terminal Tah is connected to the ground GND and the driving terminal TP is connected to the node N4 of the driving circuit 3.

The control block 4 comprises a first Zener diode DZ1 and a second Zener diode DZ2 directly connected to the cathode terminal Tch and connected, by means of a first switch SW1 and a second switch SW2 respectively, to the anode terminal Tah. A driving signal on the driving terminal TP alternately drives these switches SW1 and SW2, the driving terminal TP being directly connected to the first switch SW1 and by means of an inverting gate PL1 to the second switch SW2.

Advantageously according to the invention, the control signal OUTGate1 is on the gate terminal of the first synchronous rectifier SR1 and thus on the node N4 drives the Zener diodes DZ1 and DZ2 of the control block 4 so that:

when the control signal OUTGate1 is high, particularly equal to a supply voltage reference Vcc (i.e. in the turn-on period Ton of the device 10), the control block 4 is disabled; and when the control signal OUTGate1 passes to the low state, particularly equal to a ground voltage reference GND (i.e., in the turn-off period Toff and in the dead times DT of the device 10), the control block 4 is enabled and it sets the voltage on the terminal T1 at a clamp voltage value VCL.

In other words, the control block 4 operates as limiting circuit of the voltage oscillations during the discontinuous mode operation of the power conversion device.

The drain-source voltage signal of the second synchronous rectifier SR2 has thus the waveform shown in FIG. 6, diagram (signal B).

Supposing that the attenuation inserted by the control block 4 is null, the clamp voltage value VCL is chosen so as to be:

$VCL < VDS(Ton) - Vth$ wherein:

VDS (Ton) is the drain-source voltage value of the synchronous rectifier SR2 in the turn-on period and Vth is the threshold value of the comparator comprised in the driving circuit 3.

In this way, the driving of the synchronous rectifiers SR1 and SR2 is correct for any operating condition of the device 10, i.e., the operation of the driving circuit 3 comprised in the device 10 is always correct.

Figure 7B:
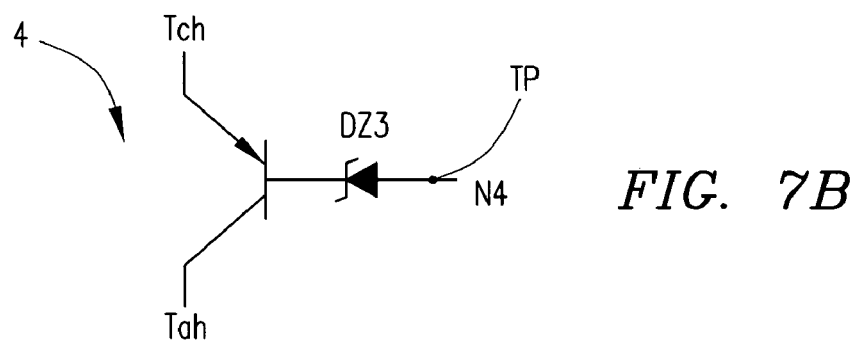

In practice it is possible to implement the control block 4 as schematically shown in FIG. 7B. In particular, the control block 4 comprises a bipolar transistor TZ3, of the PNP type, inserted between the cathode terminal Tch and the anode terminal Tah of the control block 4 and having a control terminal, particularly a base terminal connected to a Zener diode DZ3, connected in turn to the driving terminal TP of the control block 4.

In this way, in fact, when the signal on the node N4 is high, the transistor TZ3 can be turned on only if the voltage VDS (Ton) on the cathode terminal Tch is higher than the sum of the voltage of the Zener diode DZ3 and the voltage of the signal high level on the node N4. When the signal on the node N4 is low, i.e., at the same value as the ground GND, if the voltage on the cathode terminal Tch exceeds the voltage of the Zener diode DZ3, the control block 4 performs the clamp operation. It is worth noting that in the above description, the voltage drop between the emitter and base terminals of the transistor TZ3 has been implicitly considered as null.

Figure 7C:
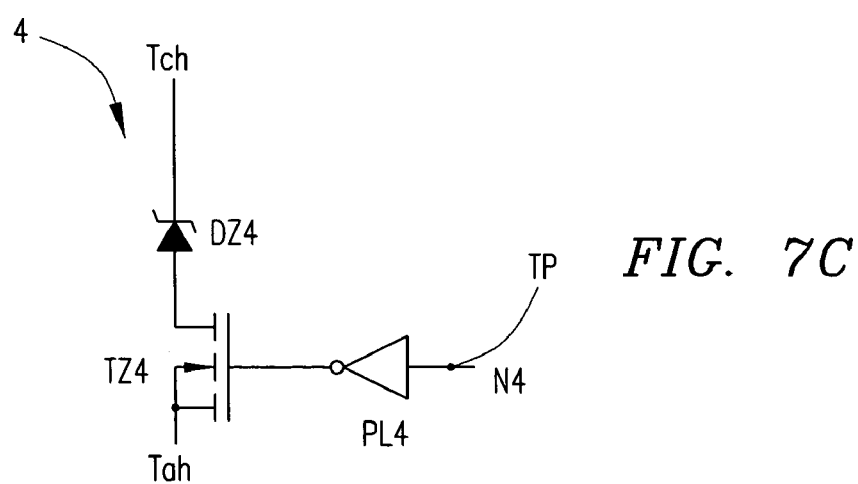

It is also possible to realize the control block 4 as schematically shown in FIG. 7C. In this alternative embodiment, the control block 4 comprises a Zener diode DZ4 and a MOS transistor TZ4 inserted, in series with each other, between the cathode terminal Tch and the anode terminal Tah of the control block 4. The MOS transistor TZ4 has a control terminal, particularly a gate terminal, connected to the driving terminal TP of the control block 4 by means of an inverting logic gate PL4.

In this way, in fact, when the signal on the node N4 is at the high level the gate voltage of the transistor TZ4 is null. This transistor TZ4 is then in the turn-off state, and the Zener diode DZ4 does not perform any limiting action, the anode terminal thereof being practically disconnected. When the signal on the node N4 is low, the gate voltage of the transistor TZ4 is high and this transistor is then in the turn-on state; in this case, the anode terminal of the Zener diode DZ4 is connected to the ground GND, thus setting the voltage value on the cathode terminal Tch, and therefore on the terminal T1, at the Zener voltage value.

It is worth noting that the embodiments of the control block 4 have been shown with reference to a Forward-topology conversion device 10, but they can be obviously used also for Flyback-topology devices if desired.

The present invention thus describes in its more general aspect a control method of a synchronous rectifier comprised in a power conversion device wherein it includes a limitation step of a voltage value applied to said synchronous rectifier during the device operation in the discontinuous mode.

To implement this control method, the power conversion device according to the invention advantageously comprises a control block 4 to limit the drain-source voltage value of the synchronous rectifier during the discontinuous mode operation, thus obtaining a correct synchronization of the driving circuit 3.

In conclusion, the conversion device according to the invention comprises a traditional driving circuit and, due to the presence of the control block, it correctly drives the synchronous rectifiers comprised therein, in all the device operating conditions, thus overcoming the limitations of known devices.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A power conversion device, comprising:
   a first and second input terminal for connection to a transformer winding;
   an output terminal;
   at least a first and second synchronous rectifier associated with said first and second input terminals, respectively;
   an inductor comprised in an output stage and inserted between said first input terminal and said output terminal;
   a driving circuit having at least first and second output terminals providing first and second control signals connected to respective control terminals of said first and second synchronous rectifiers; and
   an adjustable threshold control block between said first and second input terminal and connected to said inductor and being enabled on receipt of a low level of the first control signal from said first output terminal of said driving circuit.

2. The power conversion device according to claim 1, wherein said control block has a first cathode terminal and a second anode terminal connected to said second synchronous rectifier in the shunt configuration and a driving terminal connected to said first output terminal of said driving circuit.

3. The power conversion device according to claim 1, wherein said control block is set with a clamp voltage.

4. The power conversion device according to claim 3, wherein the value of said clamp voltage is chosen so as to be:

$$VCL < VDS(Ton) - Vth$$

wherein:

VDS (Ton) is a drain-source voltage value of said second synchronous rectifier in a turn-on period; and Vth is an internal threshold value of said driving circuit.

5. The power conversion device according to claim 4, said driving circuit comprising a threshold comparator wherein said threshold value is a threshold value of said threshold comparator.

6. The power conversion device according to claim 1, wherein said control block comprises a first and second Zener diode directly connected to a first cathode terminal and connected, by means of a first and second switch, respectively, to a second anode terminal of said control block.

7. The power conversion device according to claim 6, wherein said driving terminal of said control block is directly connected to said first switch and by means of an inverting gate to said second switch.

8. The power conversion device according to claim 1, wherein said control block comprises a bipolar transistor inserted between a first cathode terminal and a second anode terminal of said control block and having a control terminal connected to a Zener diode connected in turn to a driving terminal of said control block.

9. The power conversion device according to claim 1, wherein said control block comprises a Zener diode and a MOS transistor inserted, in series with each other, between a first cathode terminal and a second anode terminal.

10. The power conversion device according to claim 9, wherein said MOS transistor has a control terminal connected to a driving terminal of said control block by means of an inverting logic gate.

11. The power conversion device according to claim 1, wherein the device is realized in a Forward topology.

12. The power conversion device according to claim 2, wherein the device is realized in a Forward topology.

13. A power conversion device, comprising:
    a synchronous rectification circuit for connection to a transformer winding and including a rectifier node;
    an inductor coupled between the rectifier node and an output node; and
    a control circuit including a first conduction terminal connected to the rectifier node and including a control terminal, the control circuit responsive to control terminal receipt of an active state first control signal to set a voltage of the rectifier node to a certain value.

14. The device of claim 13 wherein the rectifier node is short circuit connected to a terminal of the transformer winding.

15. The device of claim 13 wherein the control circuit includes a second conduction terminal connected to a reference voltage.

16. The device of claim 13 wherein the synchronous rectification circuit comprises a first synchronous rectifier having a control terminal that also receives the first control signal.

17. The device of claim 16 wherein the first synchronous rectifier is coupled between a terminal of the transformer winding and a reference voltage.

18. The device of claim 17 wherein the synchronous rectification circuit comprises a second synchronous rectifier having a control signal that receives a second control signal.

19. The device of claim 18 wherein the second synchronous rectifier is coupled between the rectifier node and the reference voltage.

20. The device of claim 13 wherein the device operates in an "on" time period, and "off" time period and a "dead" time period, and wherein the first control signal is in the active state to set the voltage of rectifier node to the certain value during at least the dead time period.

21. A power conversion device, comprising:
 a synchronous rectification circuit for connection to a transformer winding and including a rectifier node;
 an inductor coupled between the rectifier node and an output node; and
 a switchable voltage clamping circuit including a clamp terminal connected to the rectifier node and a control terminal, the clamping circuit responsive to control terminal receipt of an active state control signal to clamp a voltage of the rectifier node to a certain value.

22. The power conversion device according to claim 21, wherein said clamping circuit comprises a first and second Zener diode directly connected to the rectifier node and connected, by means of a first and second switch, respectively, to a reference voltage node.

23. The power conversion device according to claim 22, wherein said control terminal of said clamping circuit is alternately actuates the first and second switches.

24. The power conversion device according to claim 21, wherein said clamping circuit comprises a bipolar transistor inserted between the rectifier node and a reference voltage and wherein the control terminal is connected to control the bipolar transistor through a Zener diode.

25. The power conversion device according to claim 21, wherein said clamping circuit comprises a Zener diode and a MOS transistor inserted, in series with each other, between the rectifier node and a reference voltage.

26. The power conversion device according to claim 25, wherein the control terminal is connected to a gate of the MOS transistor through an inverting logic circuit.

27. The device of claim 21 wherein the device operates in an "on" time period, and "off" time period and a "dead" time period, and wherein the control signal is in the active state to clamp the voltage of rectifier node to the certain value during at least the dead time period.

* * * * *

UNITED STATES PATENT AND TRADEMARK OFFICE
CERTIFICATE OF CORRECTION

PATENT NO.      : 7,161,813 B2                               Page 1 of 1
APPLICATION NO. : 11/019927
DATED           : January 9, 2007
INVENTOR(S)     : Fabrizio Librizzi et al.

It is certified that error appears in the above-identified patent and that said Letters Patent is hereby corrected as shown below:

Column 11, line 19,     Replace "circuit is alternately actuates"
Claim 23                With --circuit alternately actuates--

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,161,813 B2  Page 1 of 1
APPLICATION NO. : 11/019927
DATED : January 9, 2007
INVENTOR(S) : Fabrizio Librizzi et al.

It is certified that error appears in the above-identified patent and that said Letters Patent is hereby corrected as shown below:

Title page, item [75] Inventor Librizzi's residence, delete "Carania" and insert --Catania--

Title page, item [75] Inventor Macina's residence, delete "Masealucia" and insert --Mascalucia--

Title page, item [73] Assignee's residence, replace "Brianza" with --Agrate Brianza--

Title page, item [30] Foreign Application Priority Data, replace "034258319" with --03425831.9--

Signed and Sealed this

Twentieth Day of January, 2009

JON W. DUDAS
*Director of the United States Patent and Trademark Office*